United States Patent
Neffe et al.

(10) Patent No.: US 10,019,608 B2
(45) Date of Patent: Jul. 10, 2018

(54) METHOD AND DEVICE FOR PHASE CALIBRATION WITH ACTIVE LOAD MODULATION

(71) Applicant: NXP B.V., Eindhoven (NL)

(72) Inventors: Ulrich Neffe, Albersdorf-Prebuch (AT); Hubert Watzinger, Gratwein-Strassengel (AT); Michael Stark, Graz (AT); Johannes Bruckbauer, Treubach (AT); Thomas Noisternig, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/964,488

(22) Filed: Dec. 9, 2015

(65) Prior Publication Data

US 2017/0169258 A1 Jun. 15, 2017

(51) Int. Cl.
*G06K 7/10* (2006.01)
*G06K 19/07* (2006.01)

(52) U.S. Cl.
CPC ..... *G06K 7/10198* (2013.01); *G06K 7/10336* (2013.01); *G06K 19/0723* (2013.01)

(58) Field of Classification Search
CPC ........... G06K 7/10198; G06K 7/10336; G06K 19/0723; H01Q 21/0025; H01Q 1/2216
USPC ........................................................ 340/10.1
See application file for complete search history.

(56) References Cited

U.S. PATENT DOCUMENTS

| | | | |
|---|---|---|---|
| 5,574,470 A | 11/1996 | de Vall | |
| 7,098,770 B2 | 8/2006 | Charrat et al. | |
| 7,667,572 B2 * | 2/2010 | Husak | G06K 7/0008 340/10.1 |
| 7,712,672 B2 | 5/2010 | Takahashi et al. | |
| 7,764,236 B2 | 7/2010 | Hill et al. | |
| 7,876,284 B2 | 1/2011 | Mizoroki et al. | |
| 8,261,997 B2 * | 9/2012 | Gebhart | G06K 19/07749 235/487 |
| 8,461,993 B2 | 6/2013 | Mickle et al. | |
| 8,466,791 B2 | 6/2013 | Goto et al. | |
| 8,472,560 B2 * | 6/2013 | Rezayee | G06K 7/10128 340/10.1 |

(Continued)

FOREIGN PATENT DOCUMENTS

| CN | 103269220 A | 8/2013 |
|---|---|---|
| EP | 2680457 A2 | 1/2014 |
| EP | 2 988 427 A1 | 2/2016 |

OTHER PUBLICATIONS

Gebhart, Michael et al.; "Active Load Modulation for Contactless Near-Field Communication"; 6 pgs.; Jul. 14, 2012.

(Continued)

*Primary Examiner* — Ali Neyzari

(57) ABSTRACT

A method for operating an RFID device is disclosed. In the embodiment, the method involves establishing a radio-frequency link, receiving signal samples of the radio-frequency link, determining the offset of an initial phase of the link by filtering noise from the signal samples, windowing the filtered signal samples, and calculating an offset value from phase differences between the windows of signal samples, and modifying a configuration profile based on the offset value. During data transmission the configuration profile can be used to configure the transmitter in order to maintain the constant phase during transmission.

12 Claims, 5 Drawing Sheets

(56) References Cited

U.S. PATENT DOCUMENTS

| | | | |
|---|---|---|---|
| 8,947,212 B2* | 2/2015 | Tseng | G06K 19/073 340/10.4 |
| 9,331,378 B2* | 5/2016 | Merlin | H01Q 1/2225 |
| 9,331,748 B2 | 5/2016 | Bernard et al. | |
| 2008/0100527 A1 | 5/2008 | Rahim | |
| 2009/0174556 A1 | 7/2009 | Horne et al. | |
| 2009/0295526 A1 | 12/2009 | Mikami et al. | |
| 2011/0068178 A1 | 3/2011 | Gebhart | |
| 2011/0128125 A1 | 6/2011 | Kai et al. | |
| 2012/0071089 A1 | 3/2012 | Charrat et al. | |
| 2012/0105211 A1 | 5/2012 | Rezayee et al. | |
| 2012/0238899 A1 | 9/2012 | Bacquet et al. | |
| 2013/0257599 A1 | 10/2013 | Tseng | |
| 2013/0321230 A1 | 12/2013 | Merlin et al. | |
| 2014/0011461 A1 | 1/2014 | Bakalski et al. | |
| 2014/0038662 A1 | 2/2014 | Alberth, Jr. et al. | |
| 2015/0063517 A1 | 3/2015 | Verlinden et al. | |
| 2016/0197718 A1 | 7/2016 | Michel et al. | |
| 2018/0034510 A1 | 2/2018 | Hueber et al. | |
| 2018/0034621 A1 | 2/2018 | Hueber et al. | |

OTHER PUBLICATIONS

Stark, Michael et al.; "Phase-Synchronicity in Active Load Modlation for NFC and Proximity"; 5th Int. Workshop on Near Field u-Communication (NFC), ETH Zurich, Switzerland, pp. 1-27; Feb. 5, 2013.

Stark, Michael et al.; "How to guarantee Phase-Synchronicity in Active Load Modulation for NFC and Proximity"; pp. 1-6; Feb. 5, 2013.

European Search Report, 13160128.8, dated Apr. 9, 2014.

Gebhart, M. et al.; "Properties of a Test Bench to Verify Standard Complaince of Proximity Transponders"; Communication Systems, Networks and Digital Signal Processing; 5 pgs.; Jul. 2008.

Gebhart, M. et al.; "Design of 13.56 MHz Smartcard stickers with Ferrite for Payment and Authentication"; Near Field Communication; pp. 59-64; Feb. 2011.

European Search Report, 16200455, dated Mar. 28, 2017.

Advisory Action for related U.S. Appl. No. 15/224,925 (dated Feb. 22, 2018).

Extended European Search Report for related Patent Appl. No. 17183057.3 (dated Dec. 1, 2017).

Extended European Search Report for related Patent Appl. No. 17182588.8 (dated Dec. 6, 2017).

Office Action for related U.S. Appl. No. 15/224,925 (dated May 10, 2017).

Office Action for related U.S. Appl. No. 15/225,767 (dated Feb. 7, 2017).

\* cited by examiner

METHOD AND DEVICE FOR PHASE CALIBRATION WITH ACTIVE LOAD MODULATION

BACKGROUND

Mobile devices can be configured to function as radio frequency identification (RFID) device transponders utilizing near field communication (NFC). So configured, the mobile devices can be used as transponders in contactless card systems to communicate with a reader device. For example, a mobile phone can be used to communicate payment information or authorization credentials over NFC.

Typically, RFID devices utilizing NFC are configured for either passive load modulation (PLM) or active load modulation (ALM). While, ALM is typically more complex than PLM, components for implementing ALM in a transponder (e.g., a mobile device) are more compact and, because the transponder utilizes a power source to generate a magnetic field rather than just modulate a magnetic field created by a reader, an ALM transponder has a greater signal range than a PLM transponder. Small components able to produce a signal with a large signal range are often advantageous to the design and function of a mobile device configured to function as an ALM transponder.

SUMMARY

In accordance with an embodiment of the invention, a method for operating an RFID device is disclosed. In accordance with the embodiment, the method involves establishing a radio-frequency link, receiving signal samples of the radio-frequency link, determining the offset of an initial phase of the link by filtering noise from the signal samples, windowing the filtered signal samples, and calculating an offset value from phase differences between the windows of signal samples, and modifying a configuration profile based on the offset value.

In another embodiment, the method further comprises configuring an analog transponder to convert a message to an analog signal according to the configuration profile by trimming a clock offset.

In another embodiment, signal samples are received by generating clock signals from the radio-frequency link.

In another embodiment, the steps of receiving signal samples, determining the offset, and modifying a configuration profile are repeated before each transmission by the RFID device.

In another embodiment, the RFID device is calibrated without resonance tuning.

In another embodiment, the RFID is configured with a fixed resonance.

In another embodiment, the ALM transponder includes an antenna, a clock recovery circuit coupled to the antenna, a dynamic transmission configuration circuit coupled to the clock recovery circuit, the dynamic transmission configuration circuit configured to filter noise from signal samples, window the filtered signal samples, and calculate an offset value from phase differences between the windows of signal samples, an analog transmitter coupled to the dynamic transmission configuration circuit and to the antenna, an encoder coupled to the analog transmitter, an analog receiver coupled to the antenna, to the clock recovery circuit, and to the dynamic transmission configuration circuit, and a decoder coupled to the analog receiver, wherein the dynamic transmission configuration circuit is configured to trim a clock offset according to a calibration profile.

In another embodiment, the dynamic transmission configuration circuit is further configured to generate the calibration profile before each transmission by the analog transmitter.

In another embodiment, the calibration profile is transmitted to the dynamic transmission configuration circuit by an external calibration device.

In another embodiment, ALM transponder is configured to couple to an external calibration device, the external calibration device including an RF frontend receiver and signal analyzer and a controller, wherein the ALM transponder is configured to send a signal to the RF frontend receiver and signal analyzer, the RF frontend receiver and signal analyzer is configured to generate signal information, wherein the controller is configured to process the information received by the RF frontend receiver and signal analyzer, and wherein the controller is configured to generate the calibration profile based on the information and to transmit the calibration profile to the dynamic transmission configuration circuit.

In another embodiment, the RF frontend and the signal analyzer are configured to filter noise from a signal received by the ALM transponder and to window the signal into sub-signals before passing the sub-signals to the controller.

In another embodiment, the external calibration device can be coupled to multiple ALM transponders and configured to transmit the generated calibration profile to the multiple ALM transponders.

In another embodiment, the ALM transponder does not include components configured to perform resonance tuning.

In another embodiment, the ALM transponder is configured with a fixed resonance.

In a second embodiment, a method for operating an RFID device is disclosed. In the embodiment, the method involves establishing a radio-frequency link with an RFID device, receiving a generated configuration profile from the calibration device at the RFID device, and trimming a clock offset of the RFID device with a dynamic transmission configuration circuit based on the configuration profile.

In another embodiment, the method further involves receiving signal samples of the radio-frequency link, transmitting the signal samples to an external calibration device, generating a configuration profile with the external calibration device by filtering noise from the signal samples, windowing the signal samples, and calculating an offset value from the phase difference between the signal samples, and transmitting the generated configuration profile to the RFID device.

In another embodiment, the method further involves configuring an analog transponder to convert a message to an analog signal according to the configuration profile by trimming a clock offset.

In another embodiment, the configuration profile received is generated based on signal samples received by another RFID device having similar components.

In another embodiment, the configuration profile is generated without resonance turning.

In another embodiment, the steps of receiving signal samples, transmitting the signal samples, modifying a configuration profile, and transmitting the configuration profile are repeated before each transmission by the RFID device.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
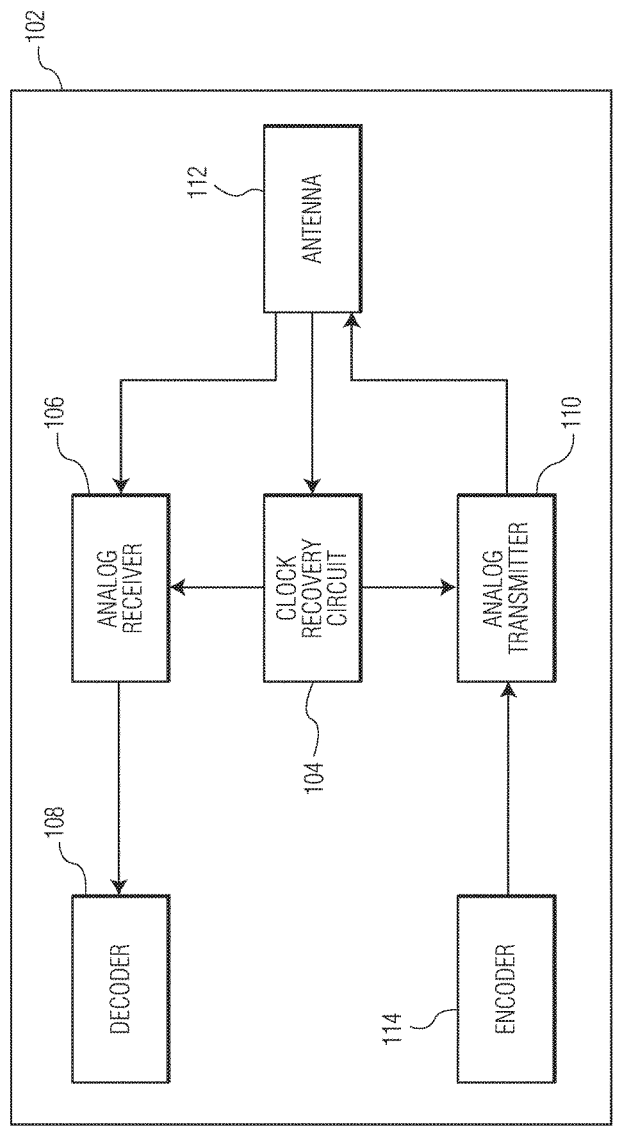
FIG. 1 is a functional block diagram of a typical ALM transponder.

FIG. 1 is a functional block diagram of a typical ALM transponder 102. The ALM transponder can include an antenna 112 that is coupled to an analog receiver 106, a clock recovery circuit 104, and an analog transmitter 110. The analog receiver can be coupled to a decoder 108 and to the analog transmitter can be coupled to an encoder 114. In operation, a radio-frequency signal can be received by the antenna and passed to the clock recovery circuit and to the analog receiver. The clock recovery circuit can generate an approximate clock signal for the signal and pass the generated clock signal to the analog receiver for processing. The analog receiver can convert the analog signal to a digital signal using the clock signal and pass the output to the decoder for further processing. When responding, the ALM transponder can encode a message with the encoder and pass the result to the analog transmitter. The analog transmitter can use the clock signal to convert the encoded message into an analog signal and the signal can be transmitted via the antenna. In an ALM transponder, the antenna can be configured to generate its own magnetic field for transmitting the signal using a current source, which results in greater communication distances. When a reader and the ALM transponder are both generating a magnetic field, the transponder and reader are ideally configured to generate magnetic fields that are in sync with one another. If the magnetic fields become offset in time relative to each other, the offset can decrease the signal strength in the amplitude portion of the modulation resulting in lower communication performance. Unlike a PLM transponder, an ALM transponder generates its own magnetic field and may be unable to listen to the magnetic field of the reader while generating the magnetic field. Thus, if the magnetic field response of the ALM transponder is shifted relative to the reader carrier (e.g., the magnetic field generated by the reader), the reader may incorrectly decode received messages resulting in a weak RF connection.

Typically, in order to prevent the magnetic fields of a transponder and a reader from becoming offset and interfering with one another (e.g., to maintain a constant phase during transmission), components with very low error-tolerance are used in the transponder. However, the low error-tolerant components are typically very costly.

In accordance with an embodiment of the invention, a method for operating an RFID device is disclosed. In accordance with the embodiment, the method involves establishing a radio-frequency link, receiving signal samples of the radio-frequency link, determining the offset of an initial phase of the link by filtering noise from the signal samples, windowing the filtered signal samples, and calculating an offset value from phase differences between the windows of signal samples, and modifying a configuration profile based on the offset value. In an embodiment, magnetic fields generated by the RFID device for the transmission of responses may be generated using the configuration profile. Thus, because the configuration profile is modified based on the signals received by the RFID device, components with greater error-tolerance and, therefore, greater capacity for maintaining a constant phase during transmission can be used in the RFID device, since the RFID device is calibrated for error introduced by the components.

Figure 2:
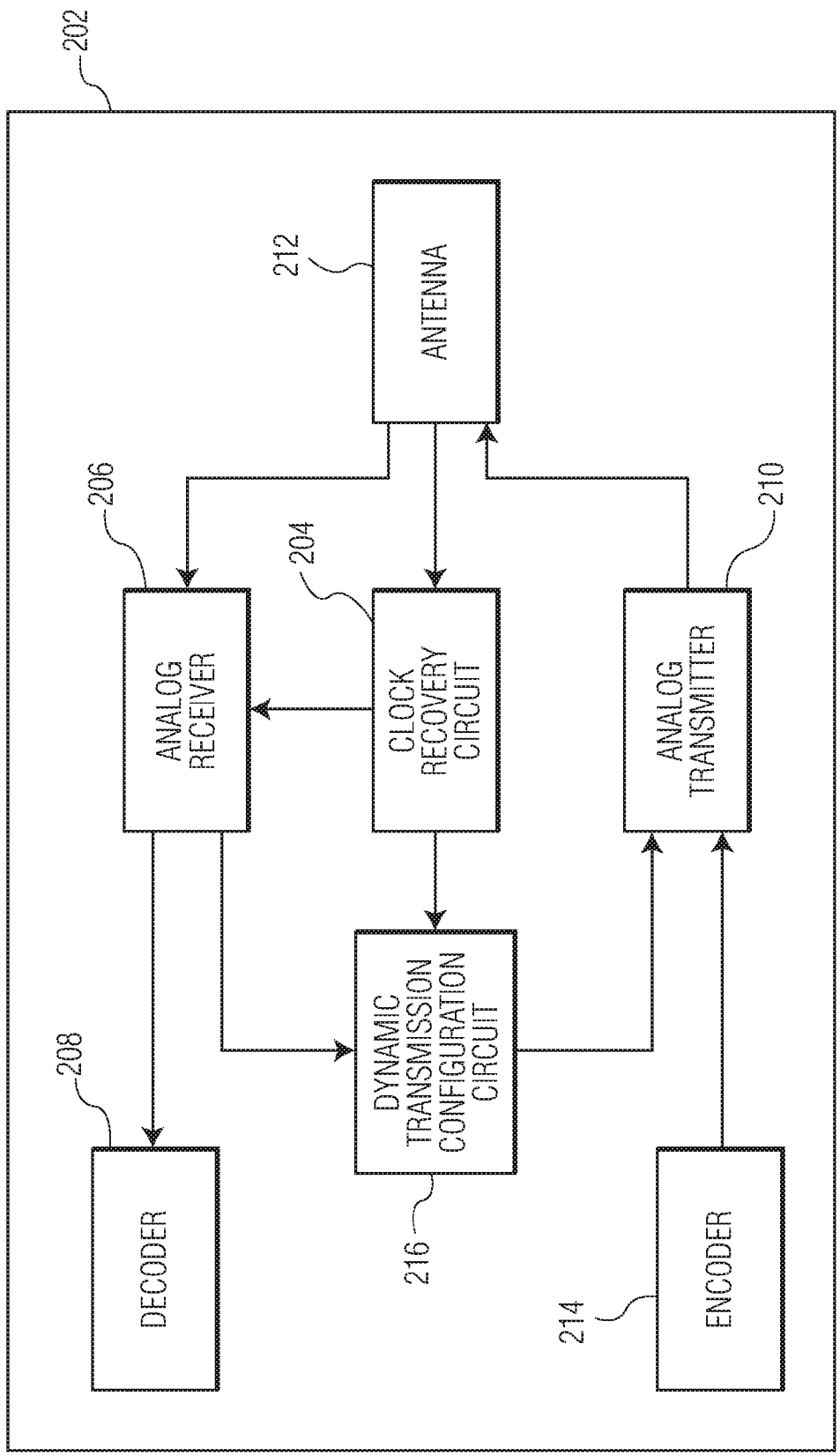
FIG. 2 is a functional block diagram of an ALM transponder configured for phase calibration in accordance with an embodiment of the invention.

FIG. 2 is a functional block diagram of an ALM transponder 202 configured for phase calibration in accordance with an embodiment of the invention. In an embodiment, the ALM transponder may include an antenna 212 that can be coupled to an analog receiver 206, a clock recovery circuit 204, and an analog transmitter 210. The analog receiver can be further coupled to a decoder 208, the analog transmitter can be further coupled to an encoder 214, and the clock recovery circuit can be further coupled to a dynamic transmission configuration circuit 216. In operation, radio-frequency signals can experience detuning due to changing coupling scenarios (e.g., inconsistent field strength or positioning within a field). In accordance with an embodiment of the invention, when a radio-frequency signal is received by the ALM transponder, the ALM transponder may be configured to collect samples of the signal for analysis and processing to modify a configuration profile for the ALM transponder and to use the configuration profile when transmitting responses to correct for detuning without requiring additional tuning components (e.g., a resonance tuner). In an embodiment, the modification of the configuration profile can involve the steps of generating a configuration profile and modifying the configuration profile repeatedly before transmitting each response.

Figure 3:
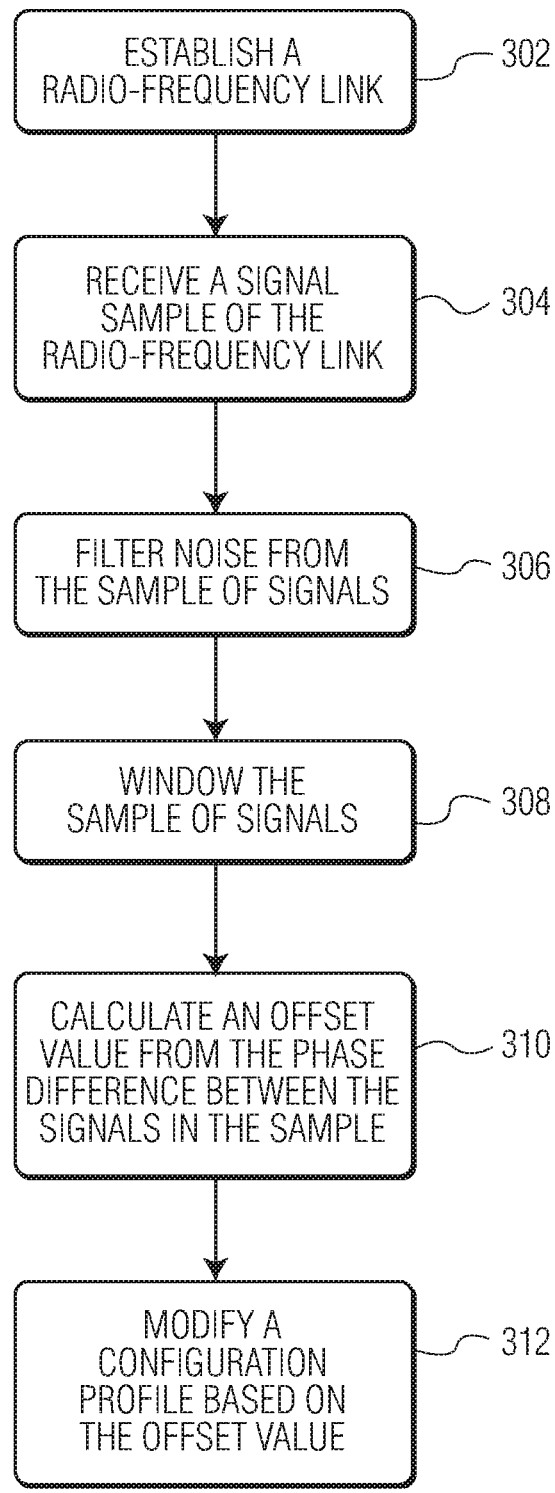
FIG. 3 is a flow chart diagram of a method for generating a configuration profile in accordance with an embodiment of the invention.

FIG. 3 is a flow chart diagram of a method for generating a configuration profile in accordance with an embodiment of the invention. At block 302, a radio-frequency link is established. In an embodiment, the radio-frequency link may be a link established via a magnetic field generated by a reader device and received by the ALM transponder. At block 304, a signal sample of the radio-frequency link is received. In an embodiment, the signal samples of the radio-frequency link may be received by generating clock signals from the link, as established at block 302 above, via a clock recovery circuit configured to generate field-synchronized reference clock signals. In an embodiment, the clock signals can be passed along to a dynamic transmission configuration circuit. At block 306, after several clock signals have been generated and passed to the dynamic transmission configuration circuit (e.g., a sample of clock signals), noise can be filtered from the sample. In an embodiment, the filtering can be performed by the dynamic transmission configuration circuit. At block 308, the filtered sample can be windowed. In an embodiment, the dynamic transmission configuration circuit can be configured to window the sample by separating the full sample into smaller sub-samples (e.g., windows) for further processing. At block 310, an offset value can be calculated from phase differences between the clock signals in the sample. In an embodiment, the dynamic transmission configuration circuit can be configured to calculate an offset using the windowed sample of signals. At block 312, a configuration profile can be modified based on the calculated offset (as well as additional offsets previously calculated). In an embodiment, the configuration profile can be a table of signal offsets and can be generated by the dynamic transmission configuration circuit based on fixed influences (e.g., component and assembly tolerances or antenna variations) and dynamic influences (e.g., transponder positioning or other environmental influences). When responding, the ALM transponder can be configured to trim a clock offset (e.g., by increasing the resistance of the clock recover circuit described with reference to FIG. 2 above) based on the configuration profile generated by the dynamic transmission configuration circuit and the analog transmitter can be configured to convert a message using the trimmed clock offset before transmission. By trimming the clock offset and converting the message into an analog signal using the trimmed clock offset, the ALM transponder can guarantee the use of a pre-defined phase when responding to a reader. In an embodiment, the ALM transponder can be configured to perform the steps of receiving signal samples, determining the offset, generating and/or modifying a configuration profile, and trimming a clock offset before converting a message into an analog signal before each transmission.

Figure 4:
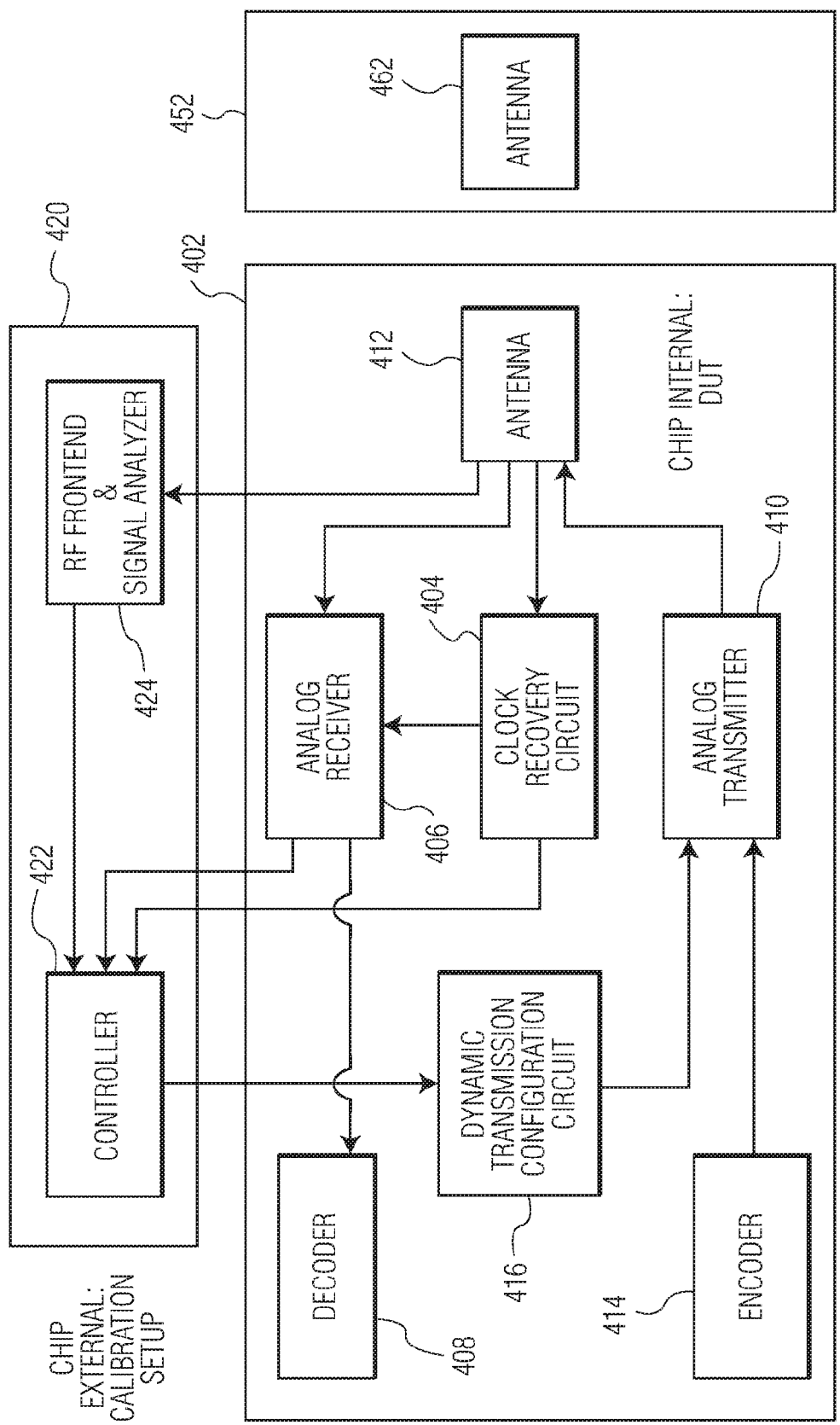
FIG. 4 is a functional block diagram of an ALM transponder and a calibration device.

In another embodiment, the calibration can be performed external to the chip using a calibration device. For example, when a signal is received by an ALM transponder, the signal can be mirrored to an external calibration device and the external calibration device can generate and/or modify a configuration profile and send the profile back to the ALM transponder for use when converting a message into an analog signal. FIG. 4 is a functional block diagram of an ALM transponder 402, a calibration device 420, and an external signal source 452. In an embodiment, the external signal source can be a RFID reader device, the ALM transponder can be the ALM transponder described above with reference to FIG. 2, and the calibration device can include an RF frontend receiver and signal analyzer 424. In an embodiment, the calibration device can be coupled to the antenna 412 of the ALM transponder and to a controller 422 of the calibration device. The controller of the calibration device can be further coupled to an analog receiver 406, a clock recovery circuit 404, and dynamic transponder configuration circuit 416 of the ALM transponder. In an embodiment, coupling can be facilitated by direct integration in the signal chain via electrical pins or by hardwiring two coupled elements together or indirectly by a data interface.

In operation, the calibration process may be performed using an external calibration device in a manner similar to the calibration process described with reference to FIG. 2. For example, as illustrated in FIG. 4, the antenna 412 of the ALM transponder 402 can be configured to receive a signal and to pass the signal along to the analog receiver 406 and to a clock recovery circuit 404, but can be further configured to pass the signal along to the RF frontend receiver and signal analyzer 424 of the calibration device 420. The RF frontend receiver and signal analyzer of the calibration device can be configured to generate signal information by filtering noise from the signal and windowing the signal. The RF frontend receiver and signal analyzer of the calibration device can also be configured to pass the generated signal information to the controller. Additionally, the clock recovery circuit of the ALM transponder can pass a generated clock signal to the controller of the calibration device and the analog receiver of the ALM transponder can pass information indicating the strength of the magnetic field generated by the signal source and the coupling conditions with the magnetic field to the controller of the calibration device. After information for a sample of signals (e.g., a sample of clock signals) has been passed to the controller via the clock recovery circuit, the analog receiver, and the RF frontend receiver and signal analyzer, the controller can be configured to generate a configuration profile and to pass the configuration profile back to the analog transmitter 410 (e.g., via the dynamic transmission configuration circuit). When responding, the ALM transponder can be configured to encode a message with the encoder and to pass the result to the analog transmitter. In an embodiment, the analog transmitter can be configured to trim a clock offset based on the configuration profile and to convert the message using the trimmed clock offset before transmission. In an embodiment, the ALM transponder can be configured to convert the encoded message without a resonance tuner.

In an embodiment, once the configuration profile has been generated for one ALM transponder, the configuration profile can be passed (e.g., via a direct connection) to another analog transmitter in another ALM transponder with similar components by the controller of the calibration device. That is, a calibration profile generated based on signal samples received from a first ALM transponder can be used to calibrate a second ALM transponder. In order to pass the configuration profile along to another analog transmitter, the calibration device can be coupled to multiple additional ALM transponders having similar components and can transmit the generated configuration profile to the additional ALM transponders without generating a second configuration profile.

Figure 5:
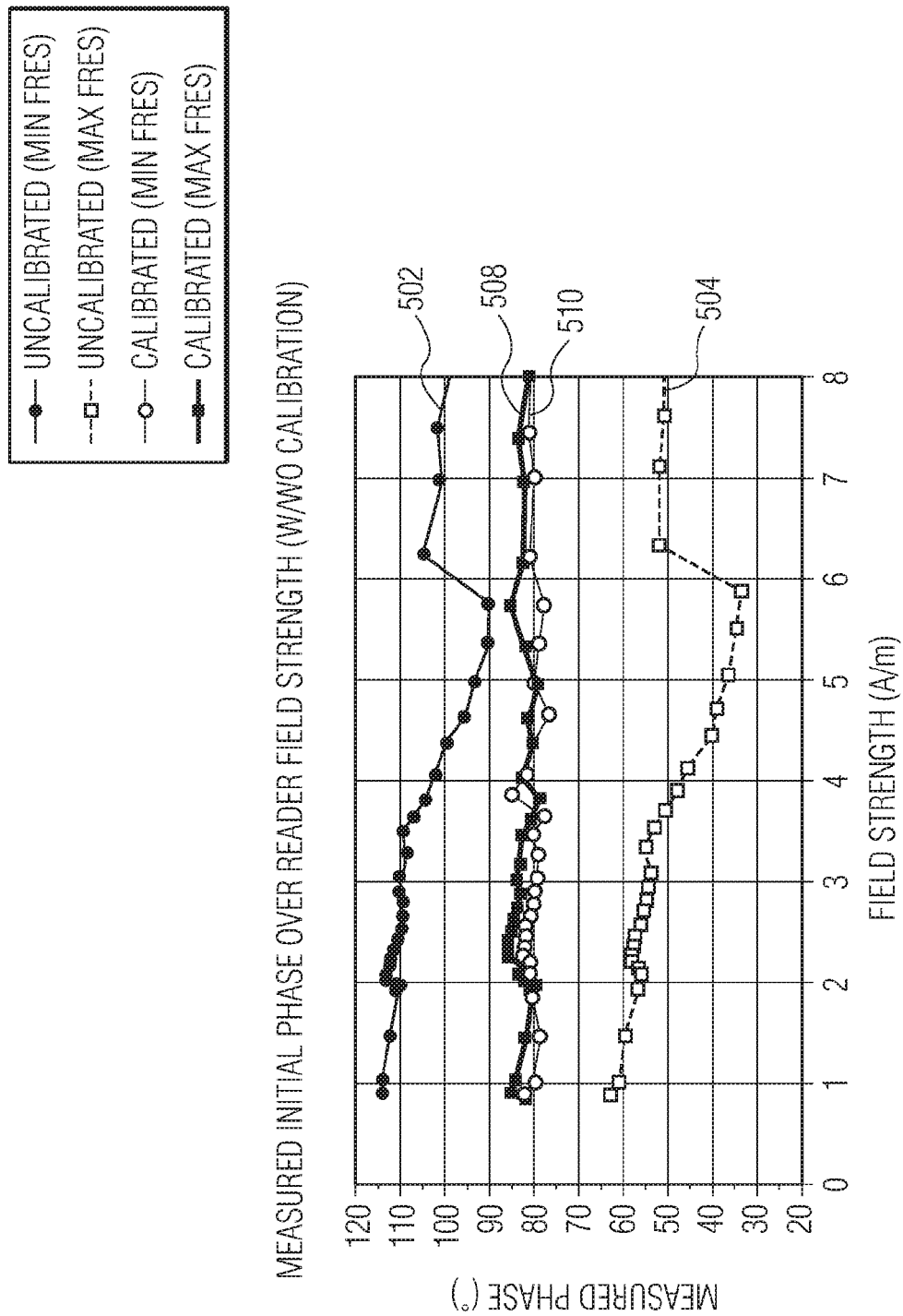
FIG. 5 is a graph indicating possible phase drift with and without calibration as performed in accordance with an embodiment of the invention.

Calibrating an ALM transponder either by generating an individual configuration profile, as described with reference to FIG. 2, or by using a configuration profile generated for multiple ALM transponders, as described with reference to FIG. 4, the functionality of the ALM transponder can be improved to decrease the likelihood that the magnetic field generated by the ALM transponder will become offset with the magnetic field generated by the reader. For example, FIG. 5 is a graph indicating possible offsets with and without calibration as performed in accordance with an embodiment of the invention. The graph of FIG. 5 plots the phase offset over a range of field strength. As illustrated, when using an uncalibrated ALM transponder, the phase of a signal generated by the ALM transponder can vary approximately eighty degrees between a maximum initial phase spread 502 and a minimum initial phase spread 504. Alternatively, when using an ALM transponder calibrated in accordance with an embodiment of the invention, the phase of a signal generated by the ALM transponder varies approximately ten degrees between a maximum initial phase spread 508 and a minimum initial phase spread 510. The reduced variance in the initial phase spread (e.g., ten degrees rather than eighty degrees) results in a significant cost saving because, for example, additional components needed for resonance tuning can be omitted in production. Additionally, in an embodiment, calibration of an ALM transponder can allow for compensation of detuning effects in readers as well as maximize ALM signal strength due the ALM transponder having a more constant phase over a range of field strengths.

Thus, in accordance with an embodiment of the invention, by calibrating an RFID device as described above, an ALM transponder can be fabricated using less costly components and a constant phase can be ensured during transmission. Less costly components can be used because, by calibrating an ALM transponder (either on an individual basis or generally for a batch of similarly structured ALM transponders), possible phase offset caused by phase drift can be accounted for and adjustments (e.g., parameterization or configuration of the ALM transponder) can be made to avoid dampening or other interference of communication between the ALM transponder and a reader in order to maintain the constant phase during transmission.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a radio-frequency identification (RFID) device, the method comprising:
   establishing a radio-frequency link;
   receiving signal samples of the radio-frequency link;
   determining an offset of an initial phase of the radio-frequency link by:
      filtering noise from the signal samples;
      windowing the filtered signal samples; and
      calculating an offset value from phase differences between a plurality of windows of the signal samples; and
   modifying a configuration profile based on the offset value.

2. The method of claim 1, wherein the method further comprises configuring an analog transponder to convert a message to an analog signal according to the configuration profile by trimming a clock offset.

3. The method of claim 1, wherein signal samples are received by generating clock signals from the radio-frequency link.

4. The method of claim 1, wherein the steps of receiving the signal samples, determining the offset, and modifying the configuration profile are repeated before each transmission by the RFID device.

5. The method of claim 1, wherein the RFID device is calibrated without resonance tuning.

6. The method of claim 1, wherein the RFID device is configured with a fixed resonance.

7. A method for operating an RFID device, the method comprising:
   establishing a radio-frequency link with an RFID device;
   receiving a configuration profile at the RFID device; and trimming a clock offset of the RFID device with a dynamic transmission configuration circuit based on the configuration profile.

8. The method of claim 7, wherein the method further comprises:
receiving signal samples of the radio-frequency link;
transmitting the signal samples to an external calibration device;
generating the configuration profile with the external calibration device by:
filtering noise from the signal samples;
windowing the signal samples; and
calculating an offset value from the phase difference between the signal samples; and
transmitting the configuration profile to the RFID device.

9. The method of claim 7, wherein the method further comprises configuring an analog transponder to convert a message to an analog signal according to the configuration profile by trimming a clock offset.

10. The method of claim 7, wherein the configuration profile is generated based on signal samples received by another RFID device having similar components.

11. The method of claim 7, wherein the configuration profile is generated without resonance turning.

12. The method of claim 8, wherein the steps of receiving the signal samples, transmitting the signal samples, generating the configuration profile, and transmitting the configuration profile are repeated before each transmission by the RFID device.

* * * * *